United States Patent [19]

Sibilia et al.

[11] Patent Number: 4,696,857
[45] Date of Patent: Sep. 29, 1987

[54] ANNEALED THIN WALLED POLYMER ARTICLES AND METHOD TO ANNEAL

[75] Inventors: John P. Sibilia, Livingston; Abraham M. Kotliar, Westfield; Narasimhaiah S. Murthy, Belle Mead; William Sacks, Gillette, all of N.J.

[73] Assignee: Allied Corporation, Morris Township, Morris County, N.J.

[21] Appl. No.: 808,807

[22] Filed: Dec. 13, 1985

[51] Int. Cl.$^4$ .................... B32B 5/16; B29B 17/00
[52] U.S. Cl. .................... 428/323; 428/331; 428/474.4; 264/211; 264/211.12; 264/346
[58] Field of Search .............. 428/35, 220, 323, 331, 428/474.4, 476.9; 264/211.12, 211, 346

[56] References Cited

U.S. PATENT DOCUMENTS

| | | | |
|---|---|---|---|
| 3,663,260 | 5/1972 | Poppe et al. | 428/461 |
| 3,733,904 | 6/1973 | Ikeda et al. | 428/220 |
| 3,903,234 | 9/1975 | Ikeda et al. | 264/210 R |
| 3,949,114 | 4/1976 | Viola et al. | 428/337 |
| 4,082,880 | 4/1978 | Zboril | 428/220 |
| 4,375,494 | 3/1983 | Stokes | 428/323 |
| 4,528,235 | 7/1985 | Sacks et al. | 428/220 |
| 4,618,528 | 10/1986 | Sacks et al. | 428/216 |

FOREIGN PATENT DOCUMENTS 1299089 7/1962 France .
1136350 12/1968 United Kingdom .

OTHER PUBLICATIONS

Mineral Fillers in Low Density–Polyethylene Films by Arina, et al. Helsinki University of Technology.

Primary Examiner—John E. Kittle
Assistant Examiner—James J. Seidleck
Attorney, Agent, or Firm—Richard A. Negin; Patrick L. Henry

[57] ABSTRACT

The permeation resistance to gases and vapors of polymeric articles including thin walled articles such as films and bottles can be increased by annealing the film. A preferred embodiment is one where the preferred polymer is polycaprolactam or high density polyethylene. There is from 1 to 50 percent of a platelet filler having an average equivalent diameter of from 1 to 8 micrometers, a maximum equivalent diameter of about 25 micrometers, and an average thickness of less than 0.5 micrometers.

17 Claims, 2 Drawing Figures

NYLON 6

POLYETHYLENE

NYLON 6

ANNEALED THIN WALLED POLYMER ARTICLES AND METHOD TO ANNEAL

BACKGROUND OF THE INVENTION

This invention relates to thin walled annealed polymeric articles such as films, a particular embodiment of this invention relates to annealed films filled with high concentrations of platelet type filler to decrease gas and vapor permeability.

It is known that mineral particles can reduce the rate of the diffusion, and hence the permeability of gases and vapors through polymeric materials. The practical application of this effect has not been achieved in film, particularly thin films of low permeability.

Thin films which are resistant to the permeability of gases such as oxygen, and vapors such as water, are useful in packaging of sensitive foods, drugs and chemicals. Typically, the permeability to oxygen as measured by gas transmission rates normalized to one mil ($2.54 \times 10^{-3}$ cm) thick films at 25° C. should be no higher than about 3.0 cc per 100 square inches (645 cm$^2$) per day per atmosphere differential across film (measured by ASTM-Test D-1434-75 Method V at 50 psi). The Moisture Vapor Transmission rate (MVT) normalized to one mil ($2.54 \times 10^{-3}$ cm) thick film should be below 0.5 grams per 100 square inches (645 cm$^2$) per day (measured according to ASTM-E96 Procedure E) when measured at 100° F. (37.8° C.) with a 90% relative humidity differential across the film. Typically, film used for packaging of foods, drugs and chemicals has a total thickness of less than about 100 micrometers to be economical. Further, such film should permit rapid heat penetration in sealing operations on packaging machines. The films must have sufficient physical properties to withstand the absuse of packaging and shipping operations without cracking.

It is known that plate-like shaped fillers are more effective than rod-like or spherical shaped fillers in lowering the rate of diffusion of gases and vapors through natural rubber, *Diffusion of Polymers,* Chapter 6, Academic Press, 1968. Great Britain Pat. No. 1,136,358 describes the use of mica in polyethylene or polystyrene to form a 125 micrometer pressed film. Other fillers disclosed in this Great Britain patent include graphite, talc and organic substrates. French Pat. No. 1,299,089 discloses the use of mica in polyvinylidene chloride copolymers to reduce permeability. The use of talc, mica and other fillers in low density polyethylene films is disclosed in a publication by Helsinki University in Polymer Science and Engineering, Jan. 19, 1979. It was noted that low density polyethylene films containing such fillers were brittle when the mineral content was above 30% by weight.

U.S. Pat. No. 4,528,235 discloses that thin polymer films and laminates containing small particle sized platelet type filler. The films are from about 10 to 100 micrometers in thickness. The polymer has a melt index of from 0.01 to 10 grams per 10 minutes at 190° C. to 250° C. as measured on ASTM Test No. D-1238 at a load of 1000 to 2160 grams. The polymer can be any suitable polymer useful for forming thin films, and is preferably a polyamide or a high density polyethylene. There is from 10 to 50 weight percent of a platelet type filler having an average equivalent diameter of about 1 to 8 micrometers. The filler is homogeneously distributed through the film and a plate through the major plane of the filler particles is substantially parallel to the major plane of the film. The substantial parallelism can be determined by X-ray diffraction analysis.

SUMMARY OF THE INVENTION

The present invention includes an article having at least one layer comprising a crystalline polymer capable of being formed into a film. The article is annealed at a temperature greater than the glass transition temperature of the polymer in order to improve the gas and vapor permeation resistance.

The present invention includes a method of improving the permeation resistance of thin-walled articles such as film or containers, including bottles and pouches and the like having a wall thickness of from 1 to 1000 micrometers, preferably from 10 to 500 and more preferably 20 to 100 micrometers. In a preferred embodiment, the article is made from a thermoplastic composition containing from 1 to 50 percent and perferably 10 to 50 percent of a platelet filler having an average equivalent diameter of from 1 to 8 micrometers, a maximum equivalent diameter of about 25 micrometers, and an average thickness of less than 0.5 micrometers. The equivalent diameter is defined as the diameter of a circle having an area equal to the surface area of one broad surface face of the platelet shaped particle. The preferred filler is talc, which is magnesium silicate. The filler is preferably homogeneously distributed through the article, film, and a plane through the major plane of the filler particles is substantially parallel to the major plane of the article, film.

The annealing step is accomplished by heating the article, such as a film, to a temperature above the glass transition temperature of the thermoplastic for a sufficient time to cause morphological changes. Preferably the thermoplastic article is heated to above its glass transition temperature greater than 0.1 seconds, and preferably greater than 0.5 seconds, and more preferably from 0.5 seconds to 24 hours.

The preferred article for use in the method of the present invention is a film or an article made using a film such as a pouch. The preferred polymers are selected from the group including, but not limited to, polyethylene, preferably high density polyethylene and polyamide, preferably polycaprolactam, polyhexamethylene adipimide. Articles of the present invention include laminates, such as film laminates, having at least one layer of a thermoplastic polymeric article which is preferably filled with platelet filler. The film laminate can be annealed or a layer within the film laminate can be annealed.

A preferred annealed film laminate has at least one talc filled high density polyethylene layer and at least one talc filled polycaprolactam layer. There can be an adhesive layer between the one layer and the additional layer. The one layer and the additional layer can be of adhesion promoting type polymers such as high amine end terminated polycaprolactam. The layers can contain additives which promote adhesion. For example, high density polyethylene layers can contain oxidized polyethylene to promote adhesion to the polyamide layer.

The present invention includes a process to make the film or film laminate as described above. The film or laminate is formed, preferably by extrusion through a die. The film laminate is preferably formed by coextrusion. The formed film is stretched in the machine direction (MD) or axial direction, and in the transverse direction (TD). The stretching of the film causes the major plane of the platelet type filler to be substantially parallel to the major plane of the film. A preferred process of stretching the film in the transverse direction is to extrude the film through a tubular film die and stretch the film in the transverse direction by blow forming the tubular film. The extent and sufficiency of parallelism of particles and film can be determined by X-ray analysis. The film laminate is then annealed.

DESCRIPTION OF THE PREFERRED EMBODIMENTS

Figure 1:
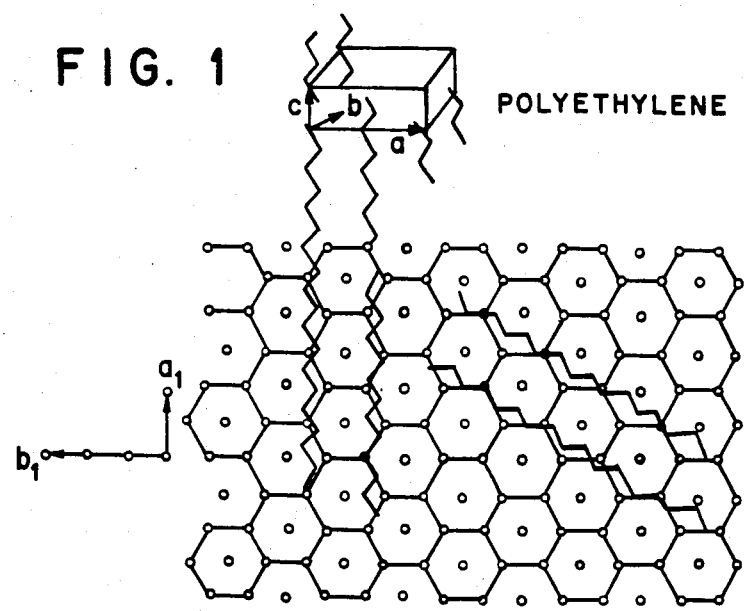
FIG. 1 is a schematic diagram of a polyethylene crystal on a coordinate system useful in X-ray analysis. Each zig-zag line represents a polymer molecule within the crystal.

The present invention is an annealed polymeric thin walled article preferably a thin walled film, a polymeric film, or a method to make the thin walled article, and a process of decreasing gas and vapor permeability of the film. The following description will consider the thin walled article to be a film or a film laminate, but the article is not limited to a film and can include a container such as a pouch or a bottle and the like.

The film of the present invention comprises a polymer capable of being formed into a film, preferably having a melt index of from 0.01 to 10 grams per 10 minute at 190° C. to 250° C. as measured on ASTM Test No. D-1238 at a load of 1000 to 2160 grams. The film contains from 0 to 50, 1 to 50, 10 to 50, and preferably 25 to 50, and more preferably 30 to 50 weight percent of a platelet type filler. The major plane of the film is the plane parallel to the broad face of the film. The film of the present invention is a thin film having a thickness of from 1 to 1000, preferably 10 to 500, more preferably 20 to 100, and most preferably 25 to 75 micrometers. The film is annealed.

For the purpose of the present invention, annealing is heating the article such as film greater than its glass transition temperature and to temperatures up to 10° C. below the melting point of the film for a sufficient time, greater than 0.1 second, preferably greater than 0.5 seconds and more preferably greater than 0.5 seconds to 24 hours, most preferably 0.5 seconds to 10 minutes.

The term platelet filler is a filler having particles which has two broad, relatively flat opposite faces. The thickness of the particle is the distance between the faces which is relatively small compared to the size of the flat opposite faces. The filler shape is characterized by the particle thickness range and the equivalent diameter. The platelet type filler should have an average diameter of from 1 to 8, and preferably 1 to 5 micrometers, a maximum equivalent diameter of about 25 micrometers, and a thickness of less than 0.5 micrometers, and preferably from 0.01 to 0.5, and more preferably 0.05 to 0.2 micrometers. For the purposes of the present invention, equivalent diameter is defined as the diameter of a circle having an area equal to the surface area of one broad surface face of the platelet shaped particle. The equivalent diameter is determined from particle surface area as measured with a Leitz Texture Analyzer System in a fully computerized and automated mode.

The filler is preferably homogeneously distributed through the film. A plane through the major plane of each platelet filler is substantially parallel to the major plane of the film.

The present invention includes an annealed film laminate having at least one layer and preferably at least two layers of the filled polymer film of the present invention. Preferably, the polymer material in one layer and the polymer in at least one additional layer comprise different polymer materials. In this way advantage can be taken of the different gas and vapor permeability properties of diverse polymeric film materials.

The polymer film of the present invention can be made of any polymer which can be formed into a film, preferably by extrusion methods, and into which from 1 to 50, preferably, 10 to 50 weight percent of the platelet type filler useful in the present invention can be homogeneously distributed. The film of the present invention can be formed into laminates with a variety of unfilled polymeric layers including those listed below.

The preferred polymers are polymers which can be formed into film by extrusion methods, and have an oxygen permeability as measured by gas transmission rates normalized to one-mil ($2.54 \times 10^3$ cm) thick film at 25° C. of about 5 cc or less per 100 in$^2$ (645 cm$^2$) per day per atmosphere, or a water vapor permeability as measured by gas transmission rates normalized to one mil ($2.54 \times 10^{-3}$ cm) thick film of about one gram or less per 100 in$^2$ per day at 90% relative humidity differential across the film at 100° F. (37.8° C.). The oxygen transmission rate is measured according to ASTM Test No. D143575 Method V at 50 psi (0.34 MPa) and the moisture transmission rate (MTV) is measured according to ASTM-E 96 Procedure E per mil (2.54 10$^{-3}$ cm) thickness.

Preferred polymers having low Moisture Vapor Transmission (MVT) include polyethylene having a density of 0.94 to 0.97 (high density polyethylene), ethylene tetrafluoroethylene copolymer, polychlorotrifluoroethylene, copolymers and terpolymers of polychlorotrifluoroethylene including ethylene chlorotrifluoroethylene copolymers, fluoronated ethylene propylene copolymers, polyvinylidene chloride copolymers, and polypropylene.

Preferred polymers having low oxygen permeability include polyamides including polycaprolactam and polyhexamethylene adipamide, polyacrylonitrile copolymers, and ethylene vinyl alcohol copolymers.

Other polymers useful in the films of the present invention include polyvinyl chloride, polyvinyl alcohol, linear saturated polyesters such as polyethylene terephthalate and polybutylene terephthalate, and ionic copolymers including the salts of copolymers of ethylene and alpha,beta ethylenically unsaturated carboxylic acids including copolymers of ethylene and the salts of acrylic acid or methacrylic acid.

The most preferred polymers useful to form the filled films of the present invention include polyamides such as polycaprolactam and polyhexamethylene adipamide, and high density polyethylene.

Copolymers of ethylene and vinyl alcohol suitable for use in the present invention can be prepared by the methods diclosed in U.S. Pat. Nos. 3,510,464; 3,560,461; 3,847,845; and 3,585,177.

The ethylene vinyl alcohol copolymer can be hydrolyzed ethylene vinyl acetate copolymer. The degree of hydrolysis can range from 85 to 99.5%. The ethylene vinyl alcohol copolymer preferably contains from 15 to 65 mol percent ethylene and more preferably 25 to 50 mol percent ethylene.

The preferred polyamide useful in the present invention has a melt index of 0.5 to 10 grams per minute as measured according to ASTM Test No. D-1238 at a load of 1000 grams at 235° C. The most preferred polyamide is polycaprolactam.

The polyethylene can be low density polyethylene, linear low density (low pressure) polyethylene, or high density polyethylene. The specific gravity range is from about 0.910 to 0.97. Low density polyethylene is commonly manufactured at high pressures of 15,000 psi (103 MPa) to 45,000 psi (310 MPa), using a free radical catalyst such as oxygen, peroxide or azo catalysts. The specific gravity of low density polyethylene is from about 0.910 to about 0.935.

Linear low density or low pressure polyethylene is manufactured at lower pressures by either the solution or gas phase process, using a coordination catalyst such as a Ziegler catalyst. The linear low density polyethylene has substantially less long chain branches than low density polyethylene. The specific gravity range of linear low density polyethylene is from about 0.915 to about 0.935.

High density polyethylene can be produced at 60° C. to 80° C., and pressures lower than 1500 psi (10.3 MPa) and as low as 100 psi (0.7 MPa), using a highly active catalyst. The usual catalyst is an alkyl metal derivative, such as triethyl aluminum, activated with titanium tetrachloride or another heavy metal derivative.

The preferred polyethylene is high density polyethylene having a specific gravity of 0.94 to 0.97 and preferably 0.96. The preferred high density polyethylene has a melt index of from 0.01 to 1.0 and preferably 0.05 to 0.8 grams per 10 minutes as measured on ASTM Test No. D-1238 using a load of 2160 grams at 190° C.

The fillers useful in the present invention are platelet type fillers having an average equivalent diameter of from 1 to 8, and preferably 1 to 5 micrometers, and a maximum equivalent diameter of about 25 micrometers and preferably 5 to 25 micrometers. The filler has a platelet thickness of less than 0.5 micrometers and preferably from 0.01 to 0.5, and more preferably 0.05 to 0.2 micrometers. Fillers useful in the present invention include but are not limited to talc, ground mica, platelet silicas, flaked metal, and flaked glass with talc being preferred.

The fillers used in the present invention can be coated with amino silane coupling agents or other substances commonly used to improve filler-polymer compatibility and adhesion of the type known in the art. Included in the amino silane coupling agents which are useful in the present invention are trialkoxysilane type agents. Specific examples of coupling agents include gamma-aminopropyltriethoxysilane, gamma-aminopropyltrimethoxysilane, gamma-aminopropylphenoldimethoxysilane, gammaglycidooxypropyl tripropoxysilane, 3,3 apoxycyclohexolethyl trimethoxysilane, gamma-propionamido trimethoxysilane, N-trimethoxysilylpropyl-N(beta-aminoethyl) amine, N-trimethoxysilylundecylamine.

The platelet like filler useful in the present invention reduces the rate of diffusion of gases and vapors through the film. In order to achieve this, it is important that the fillers are homogeneously distributed through the film, and planes through the major plane of the filler are substantially parallel to the major plane of the film.

X-ray analysis is a useful way to describe the crystallinity and orientation of polymer crystals and the orientation of talc particles. A convenient method of X-ray analysis is that described in Hermans, P. H. and Weidinger A., Makromol Chemie, Vol. 44, pp. 24–36 (1961), hereby incorporated by reference. Crystallinity Index (CI) is determined by comparing the area under crystalline peaks to the total area in the X-ray diffraction pattern. This indicates how much of the material is crystallized. One hundred means the material is fully crystalline.

For the purpose of the present invention Op, the platelet orientation factor is an indication of the platelet filler orientation in the film. The Op was determined by making azimuthal scans from densitometer tracings of the X-ray photographs which were obtained by exposing the edge of the film to the incident X-rays. The angle is the angle between the reference direction, the normal to the film, and the normal to the plane of interest, the major plane of the platlet. The Op values were calculated as the average cosine square ($<\cos^2>$) for the normal to the flat faces of the platelet talc particles. An Op of 1.0 indicates that the faces of the platelets are completely parallel to the plane of the film. An Op of 0.33 indicates that the platelets are randomly oriented. As disclosed U.S. Pat. No. 4,528,235, the Op of the platelets in the film of the present invention is from 0.70 to 1.0, preferably 0.90 to 1.0, and most preferably 0.95 to 1.0.

Particularly useful films are high density polyethylene film and polycaprolactam film. High density polyethylene is readily extrudable. Unfilled high density polyethylene has a relatively low-permeability to moisture as measured by moisture vapor transmission rates normalized to one mil ($2.54 \times 10^{-3}$ cm) thick film, about one gram per 100 in$^2$ (645 cm$^2$) per day per mil ($2.54 \times 10^{-3}$ cm) under ASTM E-96 Condition E procedures, at 100° F. (37.8° C.) with a 90% relative humidity differential across the film. Its oxygen permeability is relatively high. Polycaprolactam, also readily extrudable, has a low permeability to oxygen as measured by gas transmission rates normalized to one mil ($2.54 \times 10^{-3}$ cm) thick film, of less than 5 cc per 100 in$^2$ (645 cm$^2$) per day per atmosphere per mil at 25° C. measured according to ASTM-Test D-1435-75 Method V at 50 psi (0.34 MPa). The moisture vapor permeability of polycaprolactam film is high. The use of filler, preferably talc, reduces the permeability to moisture of the high density polyethylene and reduces the permeability of the polycaprolactam to oxygen. The result is that both high density polyethylene and polycaprolactam films become more useful for packaging oxygen and moisture sensitive products.

The present invention also includes laminates of film containing at least one polymer layer containing the filler of the present invention. Of particular interest are laminates containing different types of polymer layers filled with the platelet type filler used in the present invention. The most preferred films have at least one layer of high density polyethylene and/or one layer of polycaprolactam. A preferred film has a talc filled layer of high density polyethylene and a talc filled layer of polycaprolactam. The laminate can optionally have an adhesive layer such as an ethylene vinyl acetate copolymer modified with anhydride units between the high density polyethylene and polycaprolactam layer. Useful adhesive layers include Plexar TM modified ethylene vinyl acetate copolymer produced by Chemplex, or CXA/3095 manufactured by DuPont. Alternately, no adhesive layer need be used, and a laminate of polycaprolactam adjacent to high density polyethylene can be made wherein the talc filled high density polyethylene also contains an adhesion promotor such as oxidized polyethylene as disclosed in U.S. Pat. No. 4,322,480 to attain adhesion between a polyamide layer and a polyethylene layer.

It is recognized that in addition to laminates having at least one layer and at least one additional diverse layer of the filled films of the present invention, the laminate can additionally have a variety of nonfilled film layers.

The film of the present invention contains from 10 to 50 percent by weight of a filler. The addition of the filler stiffens the film, decreases the tensile stength, and increases the tensile modulus. It has been found that the use of oriented platelet filler in the film of the present invention has an elongation to break of greater than 50%, preferably from 50 to 500 and more preferably from 100 to 500%. The film and laminates of the present invention are self supporting.

The present invention includes a process to make the annealed film of the present invention. In the preferred method polymer and filler to be made into the film are blended. A preferred method of homogeneously distributing the filler throughout the polymer material is to melt blend it. Preferably, the melt blending can take place in a mixing type of an extruder above the melting point of the polymer and composition. The extrudate can be used to form a film directly. Alternately, the extrudate can be cooled, pelletized, and remelted later to form a film. Other methods for homogeneously distributing the filler throughout the polymer include polymerizing the polymer in the presence of the filler and premixing.

The homogeneously distributed filler and polymer are formed into a film by suitable film forming methods. Typically, the composition is melted and forced through a film forming die. The die can be a flat die or a circular die. A typical flat die is a hanger shaped die, and a typical circular die is a tubular film die.

The sheet of the filled polymer material of the present invention preferably goes through steps to cause the platelets to be distributed in the film so the major plane through the platelets are substantially parallel to the major plane through the film. A method to do this is to biaxially stretch the film. The film is stretched in the axial or machine direction by tension rollers pulling the film as it is extruded from the die. The film can be stretched in the transverse direction by clamping the film in manners known in the art. Alternately, and preferably, the film is stretched in the transverse direction by using a tubular film die and blowing the film up as it passes from the tubular film die. The biaxially stretching of the film forces the platelets into a configuration so that a plane through the major plane of the platelets is substantially parallel to the film. When the film is extruded through a tubular film die and blown up, it is preferred to blow the film up so that the diameter increases from the die diameter 1.2 to 6 times and preferably 2 to 5 times. The axial stretch can be calculated knowing the die gap thickness and the stretch or blowup in the transverse direction. Preferably the axial stretch ratio is from 1.2 to 1 to 6 to 1 using die gaps of from 25 to 1000 micrometers.

It has been found that for the platelets to be forced to align substantially parallel to the major plane of the film, the film should be made of a polymer having melt index of from 0.01 to 10 grams per 10 minutes at 190° C. to 250° C. as measured on ASTM Test No. D-1238 at a load of 1000 to 2160 grams. Polymers having a melt index in this range exert sufficient shear stress on the filler platelets during biaxially stretching to cause the platelet fillers to be substantially parallel to the major plane of the film.

Film laminates of the present invention can be made in a manner similar to make the film as described above. Instead of extruding a single film from the film die, two or more film layers with at least one layer being a filled layer in the manner of the present invention can be coextruded. To take maximum advantage of the natural permeability of the various polymers available, it is preferred to coextrude at least one layer of one polymer and an additional layer of a different polymer. The coextruded films are biaxially stretched in the manner described above with regard to the single film layers.

The film or film laminate or film to be laminated is annealed. The annealing step can be accomplished by suitable means to heat the film, such as heating the film on rollers, or rolled or unrolled in ovens. The film can be annealed either in tension or in the relaxed state. Appropriate atomspheres can also be used to promote crystallization. For example humid atmospheres enhance crystallization of nylon 6. The film to be annealed is heated to between the glass transition temperature of and up to about 10° C. below the melting point of the polymer of the composition for sufficient time to form desired improvement in barrier properties. Typically, this is from 0.1 seconds to 24 hours. Polyethylene articles can be annealed at from about 75° C. to about 100° C., and polycaprolactam articles can be annealed at from about 50° C. to about 200° C.

The present invention includes a process of decreasing gas vapor permeability of films and film laminates of the type described above. This process includes homogeneously incorporating platelet shaped fillers into the polymer film. Preferably, the polymer has a melt index of from 0.01 to 10, and more preferably 0.05 to 2.0 grams per 10 minutes, at 190° C. to 250° C., using a load of 1000 to 2160 grams as measured on ASTM Test No. D-1238. These polymers combined with the small size of the platelet fillers facilitates the parallel alignment of the fillers in the major film plane. Preferably, the platelet thicknesses are less than 0.5 micrometers, more preferably from 0.01 to 0.5, and most perferably 0.05 to 2.0 micrometers. This platelet thickness is important because the films themselves are very thin. The platelet average equivalent diameter is from 1 to 8 and preferably 1 to 5 micrometers, and the maximum equivalent diameter is about 25 micrometers.

Polymers which are resistant to permeation by particular gases and vapors when unfilled are preferred. In this way, the film or film laminate containing the platelet particles has even more improved permeation resistance to the gas or vapor that the film itself is naturally resistant to, and in addition improved permeation to other gases and vapors. Preferred polymers are those that form unfilled films which have an oxygen permeability as measured by gas transmission rates normalized to one mil ($2.54 \times 10^{-3}$ cm) thick film at 25° C. of about 5 cc or less per 100 in$^2$ (645 cm$^2$) per day per atmosphere per mil ($2.54 \times 10^{-3}$ cm) thickness (ASTM-Test No. D-1434-75 Method V) at 50 psi (0.34 MPa) or a moisture permeability as measured by moisture vapor transmission rates normalized to one mil ($2.54 \times 10^{-3}$ cm) thick film of about one gram or less per 100 in$^2$ (645 cm$^2$) per day per mil (2.54×10⁻³ cm) thickness (ASTM E-96, Procedure E). For this reason, polyamide, which is resistant to oxygen permeation, or high density polyethylene, which is resistant to moisture permeation, are particularly preferred. Talc is the preferred filler material because it is readily available, acceptable for food contact, and reasonably priced. The use of the platelet fillers and process of this invention reduces the permeability to ranges suitable to package many sensitive foods, drugs and other materials.

In accordance with the present invention, it has been found that annealing provides improved permeation resistance to the film. The film has improved resistance to the permeation of gases such as oxygen, and improved resistance to vapor transmission through the film. It is theorized that the annealing effects various aspects of the film. The annealing is believed to decrease voids within the film, decrease molecular level free volume and/or improves molecular relationships.

Figure 2:
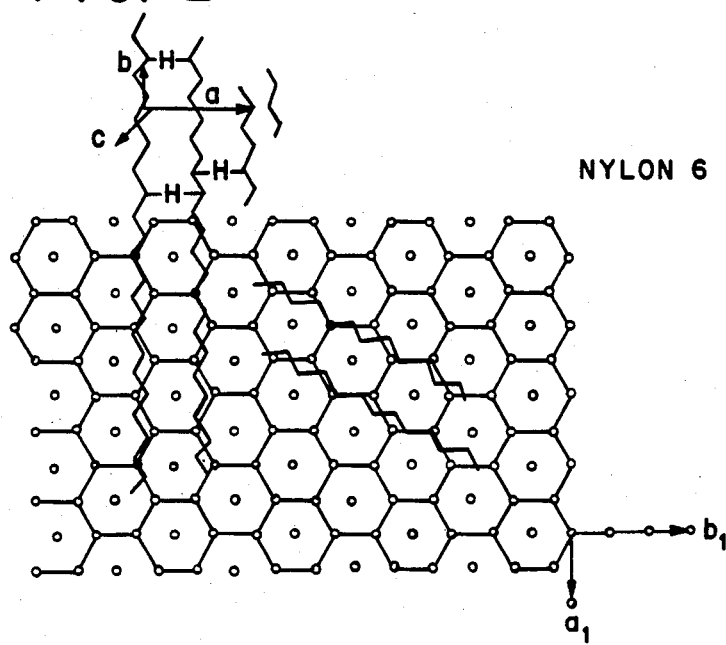
FIG. 2 is a schematic diagram of a polycaprolactam (nylon 6) cyrstal on a coordinate system useful in X-ray analysis. Each zig-zag line represents a polymer molecule within the crystal.

It is believed that annealing affects the polymer-talc interface and that epitaxial crystallization of the polymer occurs on to the platelet surface, i.e. talc surface. By epitaxial crystallization it is meant that the polymer crystallizes so that the lattice of the platelet, i.e. talc, and the polymer crystal, i.e. polyethylene or nylon 6, is matched at the platelet/polymer interface. This is illustrated in FIGS. 1 and 2. The notations $a_t$ and $b_t$ refer to the unit cell vectors of talc. The notations a, b and c refer to the unit cell vectors of the polymer. H refers to the hydrogen bonds in nylon 6. FIGS. 1 and 2 indicate that the unit cells defined by a and b (polymer) matches the unit defined by $a_t$ and $b_t$ (talc). The lattice matching acts as crystallization cites to enhance crystallizability of the polymer.

Although it is known that improved crystallinity leads to improved barrier properties of film. The examples to follow show that the annealing by itself, even without improving crystallinity, as measured by X-ray diffraction, imparts improved barrier or permeation resistance to the film. Where crystallinity cannot be measured by X-ray diffraction, it is believed that the polymer is ordered sufficiently to improve properties.

Several Examples are set forth below to illustrate the nature of the invention and the manner of carrying it out. However, the invention should not be considered as being limited to the details thereof. Composition percents are by weight unless otherwise indicated.

EXAMPLE 1

In Example 1 and Comparatives 1-3, films were made of high density polyethylene having a density of 0.96 and the melt index of 0.7 g/10 minutes as measured on ASTM Test No. D-1238 at a load of 2160 grams, at 190° C.

In Example 2, and Comparatives 4-6, films were made of high density polyethylene copolymerized with less than 1% hexene. The copolymer had a melt index of 0.08g/10 minutes measured in accordance with the procedure disclosed in Example 1.

The films made in Examples 1-2 and Comparative 1-6 were appproximately 25 micrometers (1 mil) thick. The films were extruded at temperatures of about 450° F. through a circular die 5.5 inches in diameter and blown up to produce a film 23 inches in diameter so that the blow-up ratio was 4.2 to 1.0. The expansion point of the film bubble was about 35 inches above the die.

The film of Example 1 and Comparative 1 were filled with 29 weight percent talc produced by Pfizer Minerals, Pigments and Metals Div., New York, N.Y., as Microtalc MP10-52. The talc had an average "equivalent particle diameter" of 1.3 micrometers and a maximum equivalent diameter of 9.3 micrometers. The platelet thickness of the particles was about 0.1 microns. The talc was blended into the high density polyethylene by first premixing the polyethylene in powder to form with the talc. The powder mixture was melt blended to 138° C. (280° F.) to 149° C. (300° F.) for 5 to 7 minutes on a two roll mill. The mixture was removed from the mill in sheet form and ground to 10 to 20 mesh granules. The density was measured according to ASTM D-1505. The film of Comparatives 2 and 3 were unfilled.

Talc particles were found to be oriented with flat platelet faces being paralled to the plane of the film. Platelet surface orientation factors ($O_p$) of 0.95 and 0.96 were obtained. Both increased crystallinity and platelet orientation introduce a greater path length for water molecules and give the filled polyethylene film a much higher "apparent thickness". The moisture vapor transmission (MVT) resistance improved even without an increase in crystallinity index (CI).

The film of Examples 1 and 2, and Comparatives 2 and 5, were annealed by heating in a nitrogen atmosphere for 18 hours at 100° C. (212° F.). The film of Comparatives 1, 3, 4 and 6 were not annealed.

The Moisture Vapor Transmission rate (MVT) in grams of moisture passing through 100 square inches (645 cm²) in 24 hours was measured according to ASTM-E-96, Condition E. The MVT values were normalized to a one mil (2.54×10⁻³ cm) thickness basis.

Results are summarized in Table 1.

TABLE 1

| | MI PE g/10 min | Talc % Wt. | Density | CI % | MVT | Annealed hr @ 100° C. |
|---|---|---|---|---|---|---|
| Ex. 1 | 0.7 | 29 | — | 76 | 0.45 | 18 |
| Comp. 1 | 0.7 | 29 | 1.46 | 75 | 0.70 | 0 |
| Comp. 2 | 0.7 | 0 | 0.962 | 70 | 0.61 | 18 |
| Comp. 3 | 0.7 | 0 | 0.956 | 69 | 0.90 | 0 |
| Ex. 2 | 0.08 | 29 | — | 71 | 0.49 | 18 |
| Comp. 4 | 0.08 | 29 | 1.45 | 71 | 0.71 | 0 |
| Comp. 5 | 0.08 | 0 | 0.956 | 68 | 1.03 | 18 |
| Comp. 6 | 0.08 | 0 | 0.948 | 66 | 1.24 | 0 |

The results in Table 1 show that annealing can have a significant effect on the moisture barrier properties of polyethylene films with and without talc when no increase in crystalline index is observed in the X-ray diffraction scans. The addition of talc also improves moisture barrier properties. A film containing talc which has been annealed for 18 hours has significantly improved moisture barrier properties than from either the use of talc or annealing alone. As discussed above, it is believed that orientation of the talc results in epitaxial crystallization of the polymer in the film even though X-ray methods cannot detect this component. This resulted in a more improved moisture barrier properties than might be expected from the sum of the use of either talc even or the process of annealing.

EXAMPLES 3-5

Films were produced from polycaprolactam and talc filler. The talc used was the same type as used in Examples 1-2. The amount of talc was varied as shown in Table 2. The polycaprolactam resin had a m-cresol solution viscosity of 2.5 and a melt index of 1.0 grams per 10 minutes as measured on ASTM Test No. D-1238 at 1000 gram load at 235° C. The films were extruded through a 4-inch (10.16 cm) diameter tubular die using extrusion temperatures of about 266° C. (510° F.). The films were blown up to about 8 (20.32 cm) inches in diameter and had a thickness of about 50 micrometers.

Comparative 7 contained no talc. Comparatives 8-10 contained 17, 23 and 29 percent talc respectively and were not annealed. Examples 3, 4 and 5 contained 17, 23 and 29 percent talc respectively and were annealed for 30 seconds (0.5 minutes) and 5 minutes at 175° C.

The permeability to oxygen as measured by gas transmission rates normalized to one mil ($2.54 \times 10^{-3}$ cm) thick of the films was measured at 25° C. as cubic centimeters per 100 square inches (645 cm$^2$) per day on a one mil ($2.54 \times 10^{-3}$ cm) thick basis. Results are summarized on Table 2.

TABLE 2

| | Talc Wt. % | O$_2$ Transmission $\left( \dfrac{cc}{100 \text{ in.}^2 \text{ 24 hr. 1 ml}} \right)$ After | | |
|---|---|---|---|---|
| | | 0 min. @ 175° C. | 0.5 min. @ 175° C. | 5 min. @ 175° C. |
| Comp. 7 | 0 | 2.0 | — | 2.0 |
| Comp. 8 | 17 | 1.6 | — | — |
| Ex. 3 | 17 | — | 1.3 | 1.2 |
| Comp. 9 | 23 | 1.1 | — | — |
| Ex. 4 | 23 | — | 0.8 | 0.8 |
| Comp. 10 | 29 | 1.0 | — | — |
| Ex. 5 | 29 | — | 1.0 | 0.7 |

The results show that the combination of annealing and addition of talc improves the oxygen permeability of polycaprolactam film.

EXAMPLE 6

Comparative 7 and Example 5 were annealed for 2 minutes at 200° C. as Comparative 12 and Example 6, respectively, to determine the changes in the crystalline structure of the film upon annealing as measured by X-ray diffraction. The annealed Comparatives 7 and 10 are shown as Comparatives 11 and 13, respectively. Polycaprolactam can crystallize to form alpha type crystals and gamma type crystals. The results are summarized in Table 3 below.

TABLE 3

| | Talc Wt. % | Min. @ 200° C. | CI (%) | Alpha C (%) | Gamma C (%) |
|---|---|---|---|---|---|
| Comp. 11 | 0 | 0 | 38 | 26 | 12 |
| Comp. 12 | 0 | 2 | 56 | 42 | 14 |
| Comp. 13 | 29 | 0 | 46 | 46 | 0 |
| Ex. 6 | 29 | 2 | 52 | 52 | 0 |

The data show that while annealing increases the crystalline index in unfilled films there was no significant change in the crystalline regions in the talc filled films.

While exemplary embodiments of the invention have been described, the true scope of the invention is to be determined from the following claims.

What is claimed:

1. A film comprising
a polyamide having a melt index of from 0.01 to 10 g/10 minutes as measured on ASTM D-1238 at 100 gram load at 235° C.;
from 10 to 50 weight percent of a platelet filler wherein the filler has an average equivalent diameter of from 1 to 8 micrometers, a maximum diameter of 25 micrometers, and a thickness of less than 0.5 micrometers, the filler being substantially parallel to the plane of the film, the film being from 10 to 100 micrometers in thickness, wherein the improvement comprises that the film having the platelet filler substantially parallel to the plane of the film was then annealed for from 30 sec to 24 hrs at a temperature greater than the glass transistion temperature of the polyamide.

2. The film as recited in claim 1 wherein the polyamide is polycaprolactam.

3. The film as recited in claim 1 wherein the filler is talc.

4. The film as recited in claim 3 wherein the maximum equivalent diameter of the talc is from 5 to 25 micrometers.

5. The film as recited in claim 3 wherein the average diameter of the talc is from 1 to 5 micrometers.

6. A film laminate of the type having at least one layer comprising a polyamide having a melt index of from 0.1 to 10 g/10 minutes measured on ASTM Test No. D-1238 using a load of 1000 grams at 235° C. from 10 to 50 weight percent of a platelet filler wherein the filler has an average equivalent diameter of from 1 to 8 micrometers, a maximum equivalent diameter of 25 micrometers, and a thickness of less than 0.5 micrometers, the filler being substantially parallel to the plane of the one layer of the film and at least one additional layer wherein the improvement comprises that the polyamide layer having the platelet filler substantially parallel to the surface of the film was then annealed for 30 sec to 24 hrs at a temperature greater than the polyamide glass transistion temperature.

7. The film laminate as recited in claim 6 wherein the polymide is polycaprolactam.

8. A method of decreasing the gas and vapor permeability of a thin walled article made of a thermoplastic composition comprising forming a thin walled article of a polymer having a melt index of from 0.1 to 10.0 g/10 minutes at 190° C. to 250° C. as measured on ASTM Test No. D-1238 at a load of 1000 to 2160 grams from 10 to 50 weight percent of a platelet filler wherein the filler has an average equivalent diameter of from 1 to 8 micrometers, a maximum equivalent diameter of 25 micrometers, and a thickness of less than 0.5 micrometers, the filler being substantially parallel to the surface of the article; then annealing the article at a temperature above the glass transition temperature of the polymer.

9. The method as recited in claim 8 wherein the polymer is high density polyethylene having a melt index of from 0.01 to 10 g/10 minutes as measured on ASTM Test No. D-1238 at a load of 2160 grams at 190° C. and the film is annealed at from 75° C. to 100° C.

10. The method as recited in claim 8 wherein the polymer is a polyamide having a melt index of from 0.01 to 10 g/10 minutes as measured on ASTM Test No. D-1238 at a load of 1000 grams at 235° C., and the film is annealed at from 50° C. to 200° C.

11. The process as recited in claim 8 wherein the filler is talc.

12. A method of decreasing gas and vapor permeability of a thermoplastic film having at least one layer comprising the steps of:
making a composition comprising a thermoplastic polymer and platelet shaped filler into at least one layer of the polymer film having a melt index of from 0.01 to 10.0 g/10 minutes at 190° C. to 250° C. as measured on ASTM Test No. D-1238 at a load of 1000 to 2160 grams, there being from 1 to 50 weight percent of the filler having an average equivalent diameter of from 1 to 8 and a maximum equivalent diameter of 25 micrometers, and a platelet thickness of less than 0.5 micrometers;

orienting the film to cause the platelet fillers to be substantially parallel to the plane of the film surface; and then annealing the film at a temperature greater than the glass transition temperature of the polymer.

13. The method as recited in claim 8 wherein the article was annealed between a temperature greater than the glass transition temperature of the polymer and 10° C. below the melt temperature of the polymer for from 0.1 seconds to 24 hours.

14. The method as recited in claim 13 wherein the film is annealed for 0.5 seconds to 24 hours.

15. The method as recited in claim 12 wherein the article was annealed between a temperature greater than the glass transition temperature of the polymer and 10° C. below the melt temperature of the polymer for from 0.1 seconds to 24 hours.

16. The method as recited in claim 8 wherein the article is a film.

17. The method as recited in claim 8 wherein the article is a container.

* * * * *

UNITED STATES PATENT AND TRADEMARK OFFICE
CERTIFICATE OF CORRECTION

PATENT NO. : 4,696,857
DATED : September 29, 1987
INVENTOR(S) : John P. Sibilia, et al.

It is certified that error appears in the above-identified patent and that said Letters Patent is hereby corrected as shown below:

Col. 13, line 1, "from 1 to 50" should read --from 10 to 50--.

Signed and Sealed this

Twelfth Day of April, 1988

Attest:

DONALD J. QUIGG

Attesting Officer

Commissioner of Patents and Trademarks